April 26, 1932. LE ROY C. POTTER 1,855,924
COOLING SYSTEM
Filed Feb. 24, 1930
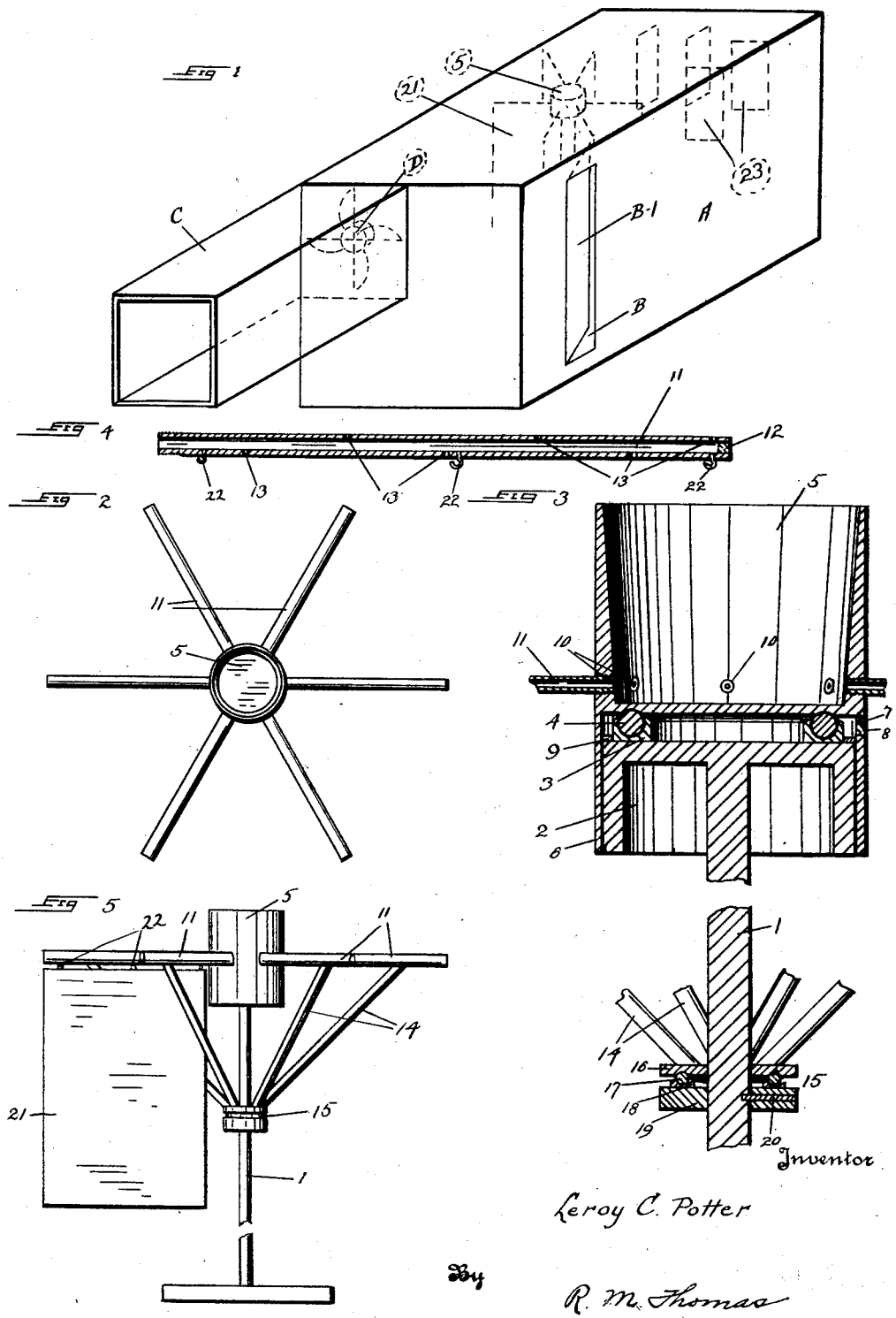

Patented Apr. 26, 1932

1,855,924

UNITED STATES PATENT OFFICE

LE ROY C. POTTER, OF SALT LAKE CITY, UTAH

COOLING SYSTEM

Application filed February 24, 1930. Serial No. 430,597.

My invention relates to humidifiers and systems of cooling dwellings and has for its object to provide a new and efficient method of directing a draft of air over water covered fabrics rotating therewithin with the draft of air to take up the moisture in passing thereover and carry the cooled moisture laden air to the different compartments of the dwelling.

A further object is to provide a method of cooling houses which consists of passing an air draft over vertical sheets of fluid soaked fabrics and then transmitting the cooled air through conduits to the rooms of the house.

A still further object is to provide a device for cooling air currents which directs a draft of air over a series of rotating sheets of water soaked or water carrying material and then transmits the cooled air to the desired location.

A still further object is to provide a device for cooling air for dwellings which consists of passing air currents over radially hung vertical sheets of fabric with the air currents adapted to rotate the sheets of fabric around a common center to completely saturate the air currents with the evaporating fluids to be carried to the rooms of the dwelling.

These objects I accomplish with the device illustrated in the accompanying drawings in which similar numerals and letters of reference indicate like parts throughout the several views and as described in the specification forming a part of this application and pointed out in the appended claims.

The device consists of a bowl, holding water, said water to be distributed into hollow radial rods on or to which vanes sheets of fabric or solid materials are hung. The suspended materials may be in multiple layers, alternating with solids, or fabrics, or consecutive, or may be in the form of enclosed compartments suspended from the radial vanes. Water passing from the bowl passes through the rods onto and/or into the fabric, at a slow rate of speed but completely saturating the fabrics in order to obtain the greatest amount of cooling properties with the least amount of liquid.

The entire device is mounted in a container having intake vents in the side walls thereof and having a suction motor driven fan to draw the air from the container and force it into the pipes leading to the different rooms. Moisture is held to a minimum by the control of the water into the bowl. The capillary attraction of the fabric materials in the suspended layers gives up the moisture slowly but cools all of the air currents passing thereover as they are drawn into, around and out of the housing by the rotary motion of the vanes and sheets of fabric. The solid surfaces of the walls and metal surfaces of the device condense some of the vapors thereon to retard the evaporation thereof.

In the drawings in which I have shown the best and most preferred manner of building my invention Figure 1 is a perspective view of the container of my device, parts indicated by dotted lines. Figure 2 is a plan view of the rotary device. Figure 3 is a section diametrically and vertically through the upper portion of the liquid distributing portion of my invention. Figure 4 is a longitudinal diametrical section of one of the radial rods. Figure 5 is a side elevation of the device, parts cut away.

In the drawings I have shown the container as A, the intake port or vents as B, and the outlet or distributing conduit as C. In the conduit C, I provide a suction type motor driven blower or fan D, which draws air from the container A and forces it from the conduit C into the rooms to be cooled. The conduit C may be directed to any desired source or may be divided and directed to several sources. The intake ports or vents are provided with deflecting vanes B1 in the opening thereof to direct incoming air currents into the container at an angle to the side walls to start a rotary action to the air currents within the container.

Mounted centrally within the container I provide a vertical support bar 1, having the top end thereof formed into a cylindrical bearing support member 2. On the top flat side of the support bearing 2, I provide a ball race 3, in which balls 4 are carried and operated. Completely surrounding the support bearing 2 and resting upon the balls 4, I then provide a fluid distributing reservoir 5, cylindrical in form and having a skirt 6 depending therefrom which skirt surrounds the bearing 3. The said skirt is provided with an oil hole 7 therethrough and a closure plug 8 therefor, to provide means of oiling the ball bearings 4. The ball race 3 is slightly smaller than the diameter of the member 2 and a washer 9 is placed thereon to hold the oil in the space above the top of the bearing member 2.

Through the side walls of the reservoir 5, I then provide threaded holes 10 in which radially extended, hollow distributing rods 11 are screwed in open connection with the interior of the reservoir 5, and plugs 12 are set into the ends of the rods to close them to hold the liquid within the rods, and small outlet ports 13 are bored through the side walls of the rods 11 to allow the fluid therein to slowly pass therefrom. Support bars 14 are secured to the rods and have their lower ends carried on a ball bearing race 15, which race 15 is mounted around the support bar 1 spaced below the bearing 2. The race 15 consists of a ball race 16, balls 17 and another race 18 to support the balls and hold them in place. The race 18 is mounted to a support plate 19 and a pin 20 holds the plate 19 supported on the bar 1. This construction provides for support of the outer ends of the radial rods. Onto the vanes I then secure the sheets or vanes of fabric or solid material 21, which sheets are to absorb or carry the liquid distributed from the rods and to aid in the distribution thereof into the air surrounding the device. The sheets of fabric may be lapped over the top of the rods or the sheets may be supported thereunder in many different manners, that shown, being to suspend the sheets therefrom on hooks 22.

In the interior of the container I then provide deflecting vanes 23 which may be made of metal or fabric and which deflect the air currents and which may be also saturated to aid in the cooling of the air currents passing thereover. The said vanes 23 are extended inwardly from the side walls at an angle designed to deflect the air currents around the container and inwardly onto the sheets of fabric, to retard the progress of the air passing through the container and to make sure that the air is saturated with moisture.

Having thus described my invention I desire to secure by Letters Patent and claim:

1. In an air cooling device the combination of a container, having inlet ports and an exhaust port therein; a blower mounted in the exhaust port to suck air from the container; a cooling member mounted within said container, consisting of a vertical shaft on which a rotary fluid reservoir is carried; hollow rods extending radially therefrom; sheets of fabric supported from said rods; ports through said rods to distribute fluid from said reservoir and rods to said sheets of fabric; means to support said reservoir on said support by ball bearing races; and means to direct the air currents entering the container upon the cooling member to rotate the member by said currents.

2. In a device of the class described the combination of a vertical shaft; a ball race mounted on the top end thereof; a liquid reservoir supported on balls carried in said race; radially extended hollow rods secured in open connection with the interior of said reservoir; sheets of fabric attached to said rods to distribute the fluid from the reservoir into the surrounding atmosphere; and means to rotate said reservoir, rods and fabrics by directing air currents there around.

In testimony whereof I have affixed my signature.

LE ROY C. POTTER.